(12) United States Patent
Ruebenhagen et al.

(10) Patent No.: US 8,570,031 B2
(45) Date of Patent: Oct. 29, 2013

(54) ANGLE SENSOR

(75) Inventors: Arnd Ruebenhagen, Dinslaken (DE); Thomas Puetter, Balve (DE); Knut Moldenhauer, Hagen (DE); Alexander Trinn, Luedenscheid (DE)

(73) Assignee: Leopold Kostal GmbH & Co. KG, Luedenscheid (DE)

( * ) Notice: Subject to any disclaimer, the term of this patent is extended or adjusted under 35 U.S.C. 154(b) by 310 days.

(21) Appl. No.: 13/205,685

(22) Filed: Aug. 9, 2011

(65) Prior Publication Data

US 2011/0309827 A1 Dec. 22, 2011

Related U.S. Application Data

(63) Continuation of application No. PCT/EP2010/055369, filed on Apr. 22, 2010.

(30) Foreign Application Priority Data

Apr. 24, 2009 (DE) .......................... 10 2009 018 893

(51) Int. Cl.
*G01B 7/30* (2006.01)

(52) U.S. Cl.
USPC .................................................. 324/207.25

(58) Field of Classification Search
USPC .................................................. 324/207.25
See application file for complete search history.

(56) References Cited

U.S. PATENT DOCUMENTS

| | | | |
|---|---|---|---|
| 6,155,106 | A | 12/2000 | Sano |
| 6,909,282 | B2 | 6/2005 | Onishi et al. |
| 7,637,020 | B2 | 12/2009 | Maier et al. |
| 2003/0056583 | A1 | 3/2003 | Schodlbauer et al. |
| 2004/0145364 | A1 | 7/2004 | Onishi et al. |
| 2007/0205762 | A1 | 9/2007 | Nakata et al. |

FOREIGN PATENT DOCUMENTS

| | | |
|---|---|---|
| DE | 19900330 A1 | 7/1999 |
| DE | 10356756 A1 | 7/2004 |
| DE | 69829233 T2 | 1/2006 |
| EP | 1132716 A1 | 9/2001 |

*Primary Examiner* — Reena Aurora
(74) *Attorney, Agent, or Firm* — Brooks Kushman P.C.

(57) ABSTRACT

An assembly for sensing the angular position of a rotatable shaft includes a bearing ring, a driving gear, and a measuring gear. The bearing ring is connectable to the shaft and has two recesses. The driving gear is rotatable about a rotational axis and has two entraining elements. The entraining elements extend radially toward the rotational axis of the driving gear and are arranged opposite one another with respect to the circumference of the driving gear. The entraining elements respectively penetrate into the recesses of the bearing ring such that the driving gear is connected to the bearing ring and rotates as the bearing ring rotates. The measuring gear is rotatable about a rotational axis and is engaged with the driving gear such that the measuring gear rotates as the driving gear rotates. One of the entraining elements is resilient.

14 Claims, 2 Drawing Sheets ial filing date of Apr. 22, 2010, which claims
ANGLE SENSOR

CROSS-REFERENCE TO RELATED APPLICATIONS

This application is a continuation of International Application No. PCT/EP2010/055369, published in German, with an international filing date of Apr. 22, 2010, which claims priority to DE 10 2009 018 893.2, filed Apr. 24, 2009; the disclosures of which are incorporated by reference.

TECHNICAL FIELD

The present invention relates to an angle sensor for sensing the rotational position of a rotatable shaft, the angle sensor including a driving gear and a measuring gear in which the driving gear is connected to the shaft and drives the measuring gear as the shaft rotates and the angular position of the shaft can be sensed from sensing the angular position of the measuring gear.

BACKGROUND

EP 1 132 716 A1 (corresponding to U.S. Pat. No. 6,552,533) describes an angle sensor for sensing the rotational position of a rotatable shaft. The angle sensor includes a driving gear and measuring gears. The driving gear is connected to the shaft and drives the measuring gears. The measuring gears have rotational position sensors such as Hall sensors and potentiometers. Angular positions of the measuring gears can be sensed by the position sensors. The measuring gears are coupled with the driving gear without play by specially-shaped spring-loaded bearing elements. This type of coupling enables compensation for static and/or dynamic deviations of the rotational axis of the shaft from its ideal position. In order to achieve this, a tradeoff is made that the rotational axes of the measuring gears deviate statically and/or dynamically from their ideal positions. This can lead to measuring errors. For example, a measuring error may occur when a magnet in a measuring gear rotates with respect to an associated Hall sensor about a rotational axis that is displaced from the ideal rotational axis of the measuring gear. Likewise, a measuring error may occur when the magnet carries out an additional relative motion with respect to the ideal rotational axis of the measuring gear instead of the intended rotational motion about the ideal rotational axis.

SUMMARY

An object of the present invention is an angle sensor having a driving gear and one or more measuring gears in which the rotational axis of each measuring gear can be fixed such that above-mentioned drawbacks may be prevented.

In carrying out the above object and other objects, the present invention provides an assembly (i.e., an angle sensor) for sensing the angular position of a rotatable shaft. The assembly includes a bearing ring, a driving gear, and a measuring gear. The bearing ring is connectable to the shaft and has first and second recesses. The driving gear is rotatable about a rotational axis and has first and second entraining elements. The entraining elements extend radially toward the rotational axis of the driving gear and are arranged opposite one another with respect to the circumference of the driving gear. The entraining elements respectively penetrate into the recesses of the bearing ring such that the driving gear is connected to the bearing ring and rotates as the bearing ring rotates. The measuring gear is rotatable about a rotational axis. The measuring gear is engaged with the driving gear such that the measuring gear rotates as the driving gear rotates. The angular position of the shaft can be sensed from the angular position of the measuring gear when the bearing ring is connected to the shaft. One of the entraining elements is resilient.

Also, in carrying out the above object and other objects, the present invention provides another assembly for sensing the angular position of a rotatable shaft. This assembly includes the bearing ring and the driving gear, but not the measuring gear.

Embodiments of the present invention are directed to an angle sensor for sensing the rotary position of a rotatable shaft. The angle sensor includes a driving gear and at least one measuring gear. The driving gear is connected to the shaft in a torque-transmitting manner. The measuring gear(s) is directly driven by the driving gear. The angular position of the shaft can be sensed from sensing the angular position of the measuring gear(s). The driving gear has two entraining elements. The entraining elements lie opposite each other relative to the circumference of the driving gear and extend radially toward the rotational axis of the driving gear. The entraining elements engage with or penetrate into associated recesses of a bearing ring; the bearing ring is rigidly connected to the shaft. At least one of the entraining elements is resilient in the circumferential direction.

An angle sensor in accordance with embodiments of the present invention enables the rotational axis of the driving gear to be fixed, for example, by a bearing in the housing of the angle sensor, so that the rotational axes of the measuring gears can also be located in relation to rotational axis of the driving gear. Static and/or dynamic deviations of the rotational axis of the shaft are compensated by the rotational coupling in accordance with embodiments of the present invention.

In an embodiment, one entraining element is formed as a rigid element and the other entraining element is resilient. The resilient entraining element includes integrally-molded spring arms. The spring arms fit against associated recesses of the bearing ring in the rest position under slight pretension at both edges.

The above features, and other features and advantages of the present invention are readily apparent from the following detailed description thereof when taken in connection with the accompanying drawings.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
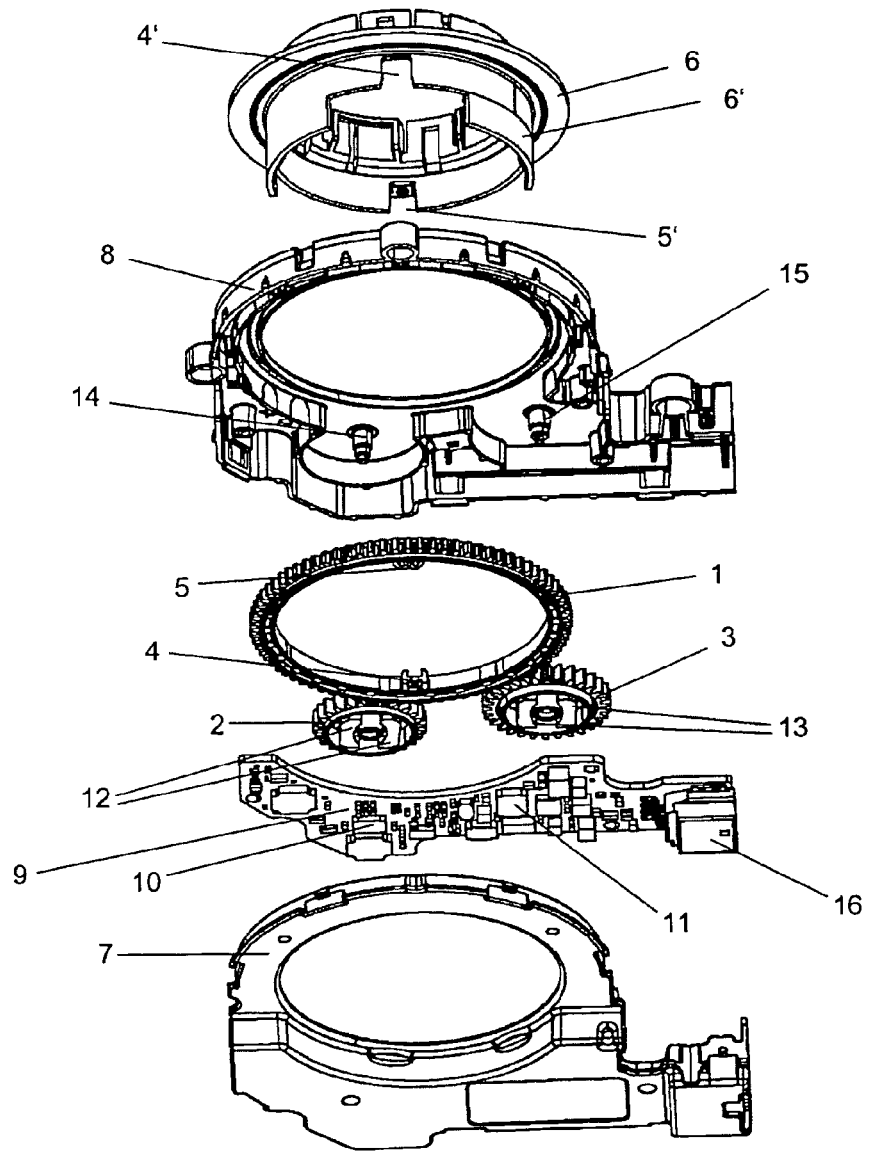
FIG. 1 illustrates an exploded view of an angle sensor in accordance with an embodiment of the present invention.
Figure 2:
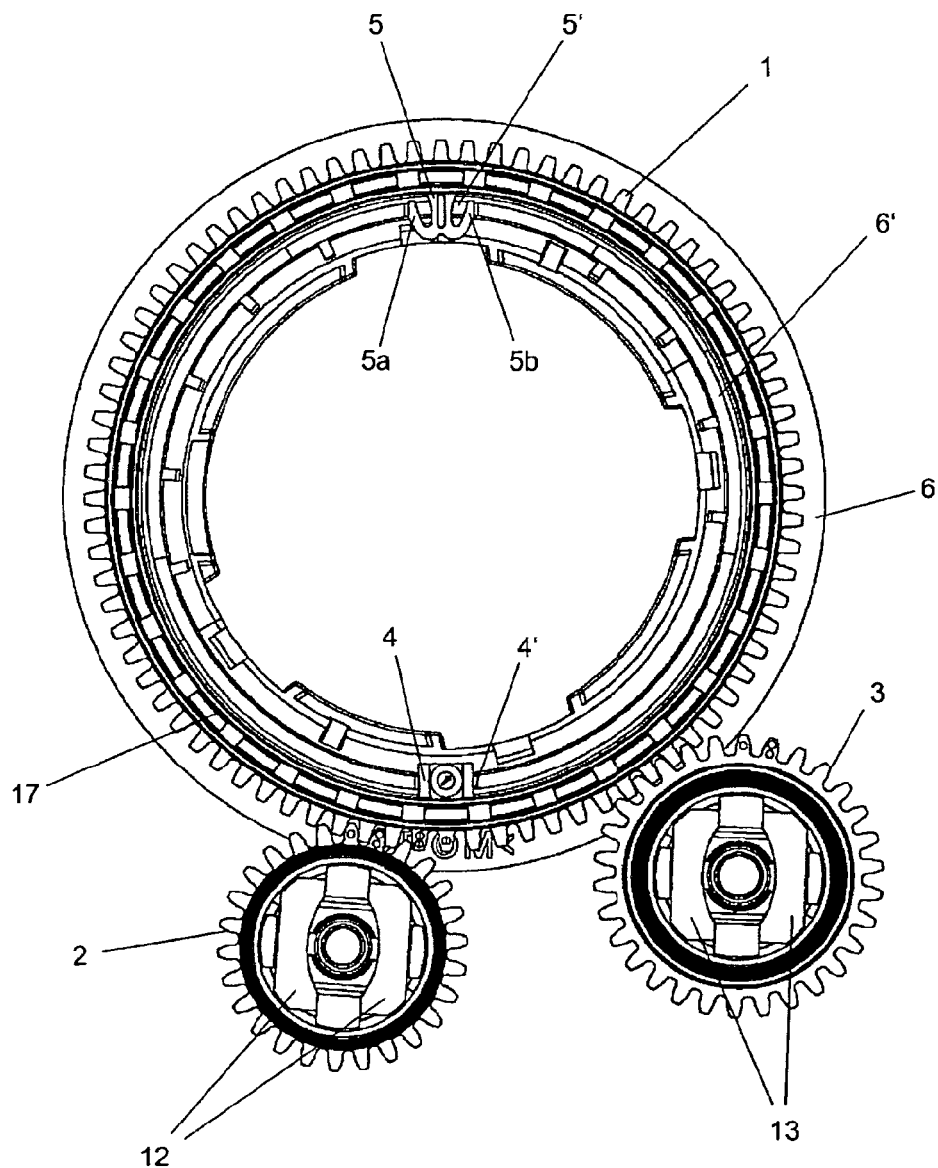
FIG. 2 illustrates a detail view from the lower side of the gears and the bearing ring of the angle sensor shown in FIG. 1.

Referring now to FIGS. 1 and 2, an angle sensor in accordance with an embodiment of the present invention will be described. The angle sensor is to sense and acquire the rotational position of a rotatable shaft. For example, in this embodiment, the angle sensor is a magnetic steering angle sensor for a motor vehicle and the rotatable shaft is the steering wheel shaft of the vehicle.

The angle sensor includes a driving gear wheel 1, a first measuring gear wheel 2, and a second measuring gear wheel 3. Driving gear 1 and measuring gears 2, 3 are each rotatable about their own rotational axis. Driving gear 1 is connected to the shaft (not shown) such that driving gear 1 rotates and transmits torque with the shaft as the shaft rotates. Measuring gears 2, 3 engage or mesh with driving gear 1 such that driving gear 1 directly drives measuring gears 2, 3 as the shaft rotates.

The angle sensor further includes a sensor housing having a lower housing part 7 and an upper housing part 8. Driving gear 1 is rotatably mounted between housing parts 7, 8. First measuring gear 2 is rotatably mounted in upper housing part 8 on rotational axis 14. Second measuring gear 3 is rotatably mounted in upper housing part 8 on rotational axis 15. Rotational axes 14, 15 of measuring gears 2, 3 are aligned parallel to the rotational axis of driving gear 1.

Driving gear 1, measuring gears 2, 3, and housing parts 7, 8 are fabricated as plastic injection moldings from suitable plastic materials.

Measuring gears 2, 3 are smaller than driving gear 1 and have different numbers of teeth. As a result, the angular position of driving gear 1, and thus the angular position of the shaft when driving gear 1 is connected to the shaft, can thereby be sensed from the respective angular positions of measuring gears 2, 3. The angular position of the shaft can be sensed from the angular positions of measuring gears 2, 3 even through multiple revolutions using a beat frequency angle. U.S. Pat. No. 7,637,020, which is hereby incorporated by reference, provides a description of sensing the angular position of the shaft from the respective angular positions of measuring gears 2, 3.

The angle sensor further includes a printed circuit board 9 mounted to housing parts 7, 8. First and second Hall sensors 10, 11 are arranged on circuit board 9. Hall sensors 10, 11 are respectively associated with measuring gears 2, 3. In particular, first measuring gear 2 includes a first permanent magnet 12 located therein and second measuring gear 3 includes a second permanent magnet 13 located therein. First Hall sensor 10 detects the orientation of the magnetic field produced by first magnet 12 in order to sense the angular position of first measuring gear 2. Similarly, second Hall sensor 11 detects the orientation of the magnetic field produced by second magnet 13 in order to sense the angular position of second measuring gear 3. As such, Hall sensors 10, 11 carry out the acquisition of the angular positions of measuring gears 2, 3. The rotational position of the shaft can be determined from the angular positions of measuring gears 2, 3.

Hall sensors 10, 11 are located on the underside of circuit board 9 facing away from measuring gears 2, 3. Additional angle sensor measuring and evaluating circuit components may also be collected on the underside of circuit board 9. Exact positioning of Hall sensors 10, 11 with respect to measuring gears 2, 3, and thus with respect to magnets 12, 13, is accomplished by two holes in circuit board 9. The continuations of rotational axes 14, 15 supporting measuring gears 2, 3 respectively penetrate into the two holes in circuit board 9. A plug-and-socket connector piece 16 for making contact with a mating connector piece is located on the edge of circuit board 9 for connecting with other control devices.

Driving gear 1 includes a first entraining element 4 and a second entraining element 5. Entraining elements 4, 5 are integrally molded on driving gear 1. Entraining elements 4, 5 enable a torque transmitting connection of driving gear 1 with the shaft. Entraining elements 4, 5 are arranged opposite one another with respect to the circumference of driving gear 1 and extend in the radial direction to the rotational axis of driving gear 1.

The angle sensor further includes a bearing ring 6. Bearing ring 6 rigidly connects with the shaft (e.g., the steering wheel shaft). Bearing ring 6 has recesses 4', 5'. Entraining elements 4, 5 of driving gear 1 penetrate into respective recesses 4', 5' of bearing ring 6 to thereby connect driving gear 1 to the shaft via bearing ring 6.

First entraining element 4 is rigid. Second entraining element 5 includes integrally-molded spring arms 5a, 5b. Spring arms 5a, 5b are resilient and fit against the associated recess 5' of bearing ring 6 in the rest position under slight pretension at both of the edges.

Bearing ring 6 has a hollow cylindrical shaft 6'. Cylindrical shaft 6' penetrates from above into upper housing part 8 and downward until it passes through driving gear 1. Cylindrical shaft 6' is thereby provided with a smaller outer diameter than the inner diameter of driving gear 1 so that compensation for radial play between them is possible. Recesses 4', 5' of bearing ring 6 for engaging respective entraining elements 4, 5 of driving gear 1 are on two opposite sides of cylindrical shaft 6'.

In an ideal situation, the rotational axes of the shaft and driving gear 1 are identical. That is, ideally, the rotational axis of the shaft and the rotational axis of driving gear 1 lie together along a straight line. However, non-insignificant tolerances play a role under conditions of actual assembly that affect the positions of these rotational axes with respect to one another in a fixed rotational position. Such tolerances are known as static tolerances. Dynamic tolerances have to also be taken into consideration, especially in cases where the shaft is a steering wheel shaft of a vehicle since a certain amount of play cannot be eliminated in the steering wheel shaft. In accordance with embodiments of the present invention, deviations of the rotational axis of the shaft and the rotational axis of driving gear 1 are compensated by the torque transmitting connection.

A view of driving gear 1 and measuring gears 2, 3 is shown in the direction of the rotational axis in FIG. 2 to describe the operation of the torque transmission. Driving gear 1 and measuring gears 2, 3 are mounted in the sensor housing as free from play as possible so that their positions are fixed with respect to one another and a hysteresis-free rotational transmission is assured. A ring shaped gap 17 lies between cylindrical shaft 6' of bearing ring 6 so that the only contact between them arises during engagement of entraining elements 4, 5 of driving gear 1 in the associated recesses 4', 5' of bearing ring 6. A compensation of the tolerance between driving gear 1 and bearing ring 6, and thus also between driving gear 1 and the shaft, occurs because of the free displaceability of bearing ring 6 with respect to driving gear 1 in the direction of the line connecting entraining elements 4, 5, as well as perpendicular to this direction, through the displaceability of bearing ring 6 due to the flexibility of spring arms 5a, 5b of the elastically-designed entraining element 5. Rigid entraining element 4, which is always in contact with both edges of the associated recess 4' of bearing ring 6, assures that every rotational motion of bearing ring 6 is transmitted free of hysteresis into a rotational motion of driving gear 1 and thus also to measuring gears 2, 3.

While exemplary embodiments are described above, it is not intended that these embodiments describe all possible forms of the present invention. Rather, the words used in the specification are words of description rather than limitation, and it is understood that various changes may be made without departing from the spirit and scope of the invention. Additionally, the features of various implementing embodiments may be combined to form further embodiments of the present invention.

What is claimed is:

1. An assembly for sensing the angular position of a rotatable shaft, the sensor comprising:
   a bearing ring connectable to the shaft, the bearing ring having first and second recesses;
   a driving gear rotatable about a rotational axis, the driving gear having first and second entraining elements, the entraining elements extending radially toward the rotational axis of the driving gear and are arranged opposite one another with respect to a circumference of the driving gear, the entraining elements respectively penetrating into the recesses of the bearing ring such that the driving gear is connected to the bearing ring and rotates as the bearing ring rotates; and
   a measuring gear rotatable about a rotational axis, the measuring gear being engaged with the driving gear such that the measuring gear rotates as the driving gear rotates;
   wherein one of the entraining elements is resilient.

2. The assembly of claim 1 wherein:
   the angular position of the shaft can be sensed from the angular position of the measuring gear when the bearing ring is connected to the shaft.

3. The assembly of claim 1 wherein:
   one of the entraining elements is rigid.

4. The assembly of claim 1 wherein:
   the first entraining element is rigid, and the second entraining element is resilient and has first and second spring arms.

5. The assembly of claim 4 wherein:
   the spring arms of the second entraining element fit against the second recess of the bearing ring in a rest position under slight pretension at both edges.

6. The assembly of claim 1 further comprising:
   a housing;
   wherein the driving gear and the measuring gear are mounted in the housing.

7. The assembly of claim 1 further comprising:
   a magnetic field sensor fixed in position adjacent the measuring gear;
   wherein the measuring gear includes a magnet;
   wherein the magnetic field sensor senses the magnet of the measuring gear to sense the angular position of the measuring gear.

8. The assembly of claim 1 further comprising:
   a second measuring gear rotatable about a rotational axis, the second measuring gear being engaged with the driving gear such that the second measuring gear rotates as the driving gear rotates;
   wherein the angular position of the shaft can be sensed from the angular positions of the measuring gears over more than a complete revolution when the bearing ring is connected to the shaft.

9. The assembly of claim 1 wherein:
   the shaft is a steering wheel shaft of a vehicle.

10. An assembly for sensing the angular position of a rotatable shaft, the sensor comprising:
    a bearing ring connectable to the shaft, the bearing ring having first and second recesses; and
    a driving gear rotatable about a rotational axis, the driving gear having first and second entraining elements, the entraining elements extending radially toward the rotational axis of the driving gear and are arranged opposite one another with respect to a circumference of the driving gear, the entraining elements respectively penetrating into the recesses of the bearing ring such that the driving gear is connected to the bearing ring and rotates as the bearing ring rotates;
    wherein one of the entraining elements is resilient.

11. The assembly of claim 10 wherein:
    one of the entraining elements is rigid.

12. The assembly of claim 10 wherein:
    the first entraining element is rigid, and the second entraining element is resilient and has first and second spring arms.

13. The assembly of claim 12 wherein:
    the spring arms of the second entraining element fit against the second recess of the bearing ring in a rest position under slight pretension at both edges.

14. The assembly of claim 10 wherein:
    the shaft is a steering wheel shaft of a vehicle.

* * * * *